United States Patent [19]

Anderson

[11] Patent Number: 5,164,914
[45] Date of Patent: Nov. 17, 1992

[54] FAST OVERFLOW AND UNDERFLOW LIMITING CIRCUIT FOR SIGNED ADDER

[75] Inventor: Daryl E. Anderson, Corvallis, Oreg.

[73] Assignee: Hewlett-Packard Company, Palo Alto, Calif.

[21] Appl. No.: 637,251

[22] Filed: Jan. 3, 1991

[51] Int. Cl.5 .............................................. G06F 11/00
[52] U.S. Cl. .................................. 364/745; 364/736.5
[58] Field of Search ...................... 364/745, 736.5, 737

[56] References Cited

U.S. PATENT DOCUMENTS 4,722,066  1/1988  Armer et al. ....................... 364/745
4,817,047  3/1989  Nishitani et al. ..................... 364/745
4,819,198  4/1989  Noll et al. ........................... 364/745
4,945,507  7/1990  Ishida et al. ....................... 364/736.5
5,038,314  8/1991  Kelleher ............................. 364/745

Primary Examiner—David H. Malzahn

[57] ABSTRACT

In a signed binary adder circuit, limiter control circuitry detects underflow and overflow conditions, and controls combinatorial result limiter circuits in each bit position to limit the result to predetermined values under such conditions, respectively. The limiter circuits employ OR-AND-INVERT logic (OAI) to provide the appropriate result bits without clock delay for fast limiting.

8 Claims, 1 Drawing Sheet

FAST OVERFLOW AND UNDERFLOW LIMITING CIRCUIT FOR SIGNED ADDER

BACKGROUND OF THE INVENTION

The present invention relates to the field of binary adder circuits and, more particularly, to circuitry for modifying truncated result data under out-of-range conditions.

Various binary adders are known. Examples includes carry-save adders, carry lookahead adders, etc. A full adder receives two binary operands and sums them to provide a single binary result. Full adder circuitry includes a predetermined number of bit positions. Each bit position or adder "cell" receives a corresponding bit of each operand, and provides a corresponding sum bit. The sum bits from all cells in the adder, taken together in an ordered series, form the result.

Each full adder cell also has a carry input terminal and a carry output terminal for interconnecting the cell to other cells in the adder. The result may also include a most significant bit (msb) taken from a carry output of the most significant cell.

The range of an adder circuit is the range of numbers that can be represented as the result. This range depends upon the number of bits or cells in the adder, and upon the number representation convention used. For example, integers may be represented as signed or unsigned. Signed integers may be represented using complement codes such as two's complement representation. Using a two's complement signed represented in the most significant or "sign bit" position (msb) as 1 for a negative number and 0 for a positive number. The result range using, for example, 16 bits thus is $+2^{15}-1$ (represented as 011 ... 111) to $-2^{15}$ (represented as all ones).

An overflow condition exists when the result of summing the two operands exceeds the result range. The term "overflow" is often used generically to include both positive and negative results outside the available range. I will use the terms overflow and underflow to distinguish these two cases, respectively. For many applications, overflow and underflow conditions must be detected because the adder result may be erroneous.

In the two's complement system, the result will be erroneous when both summands are positive and there is a carry into the sign bit. Indeed, in this overflow condition, the magnitude of the error is very substantial because the apparent result is negative (the sign bit is a one), when in fact the correct result is a positive number that exceeds the adder range. Just the opposite occurs in an underflow condition. The sum of two negative summands appears to be a positive number, unless there is a carry into the sign bit. See S. Waser and M. Flynn, INTRODUCTION TO ARITHMETIC FOR DIGITAL SYSTEMS DESIGNERS pp. 12-13 (Holt, Rinehart and Winston 1982). Truncation errors of the type described are unacceptable in many designs, for example, where the adder result is input to a DAC to form an analog signal.

While adder results cannot be represented correctly when they exceed the range of the adder, the magnitude of the error can be minimized by forcing the result to a maximum representable value in response to an overflow condition and, similarly, forcing the result to a minimum representable value in response to an underflow condition. For example, U.S. Pat. No. 4,511,922 (the '922 patent) is directed to a digital television system with truncation error correction. The '922 patent, FIG. 3, shows a synchronous circuit in which adder (46) result bits are input to a latch (48) consisting essentially of D-type flip-flop circuits. The adder includes an extra bit position $\Sigma_R$ which sums replicated sign bits $A_R$ and $B_R$.

An overflow condition drives preset inputs to the flip-flops (75) to force all the flip-flop outputs HIGH on the next clock signal. Similarly, an underflow condition drives reset inputs to the flip-flops (76) to force all the flip-flop outputs LOW on the next clock signal. The '922 circuit thus delays the adder results under all conditions until a next clock cycle. The '922 circuit also employs a large number of devices and therefore increases circuit size. Delay time through the flip-flops adds to the clock signal delay, all of which results in relatively slow operation.

SUMMARY OF THE INVENTION

In view of the foregoing background, an object of the present invention is to correct for truncation error without unduly degrading performance of the adder.

Another object is to set the result bits in a signed adder to preset limits in response to overflow or underflow conditions without incurring clock delay.

A further object of the invention is to provide combinatorial logic circuits for high speed asynchronous overflow and underflow limiting in a signed adder.

According to one aspect of the invention, an asynchronous method of correcting for truncation error in a signed binary adder includes providing combinatorial limiting logic in each result bit position and, in response to the detection of an overflow condition, immediately driving the combinatorial limiting logic to a predetermined state. In this way, clock delay in limiting the result value is avoided.

Another aspect of the invention includes combinatorial truncation error correction circuitry. The correction circuitry includes limiter control logic coupled to the operands. The limiter control logic provides logic signals for indicating overflow and underflow conditions to control combinatorial limiter logic provided in each magnitude bit position in the adder.

The limiter logic in each magnitude bit position includes an OR gate having two input terminals and an output terminal, and a NAND gate having two input terminals and an output terminal for providing a respective result magnitude bit. One of the OR gate input terminals is coupled to receive a respective inverted sum bit. The other OR gate input terminal is coupled to receive a limiter control logic signal. The OR gate output terminal is coupled to one of the NAND gate input terminals in an OAI configuration. The other NAND gate input terminal is coupled to receive another limiter control logic signal. The limiter control logic signals control the OAI circuit so that, in operation, each result magnitude bit is set HIGH responsive to an overflow condition, set LOW responsive to an underflow condition and otherwise is set equal to a complement of the corresponding sum bit.

The foregoing and other objects, features and advantages of the invention will become more readily apparent from the following detailed description of a preferred embodiment which proceeds with reference to the drawing.

DETAILED DESCRIPTION OF A PREFERRED EMBODIMENT

Figure 1:
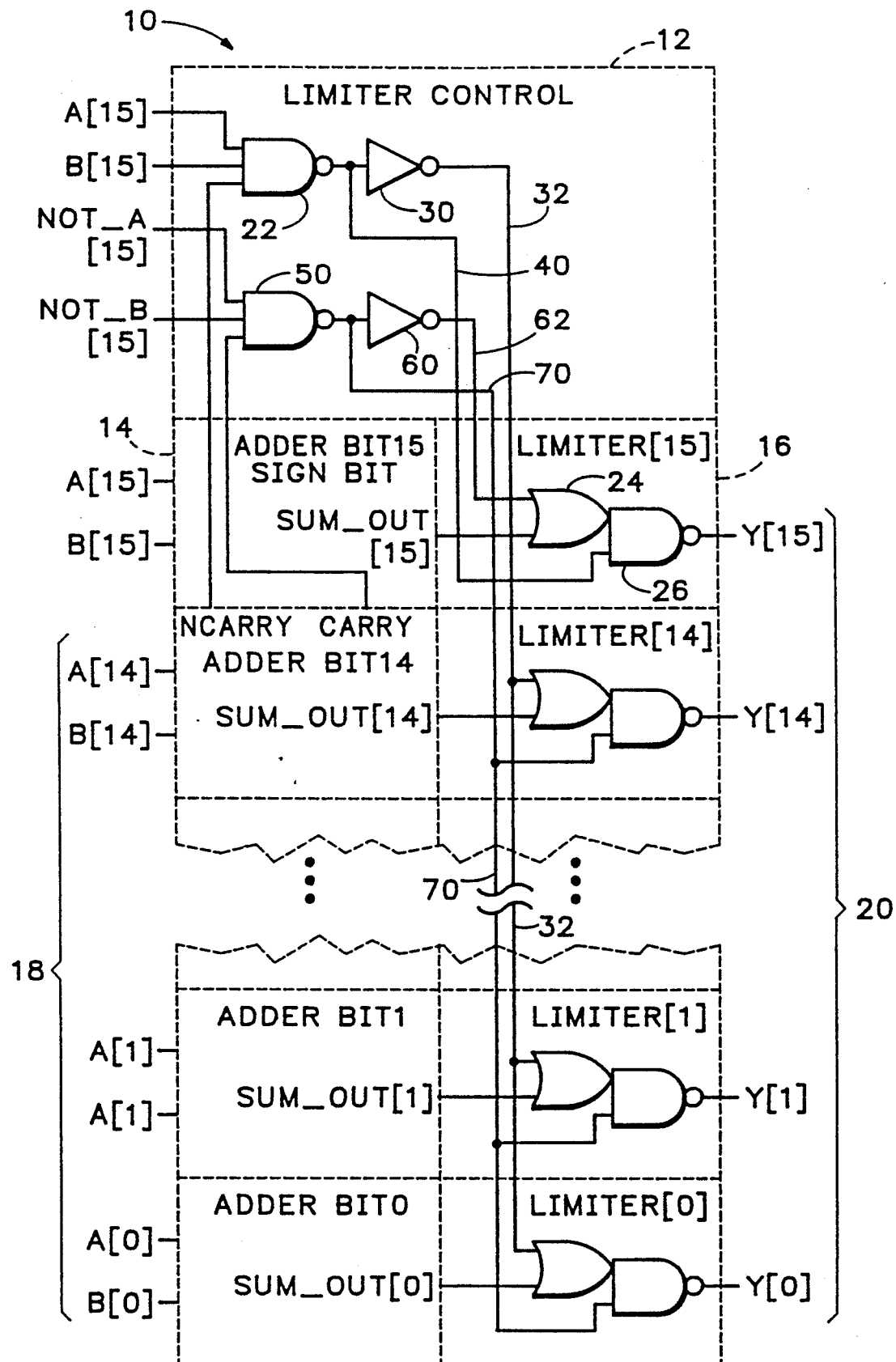
FIG. 1 is a partial block, partial schematic diagram of a signed adder circuit that includes fast overflow and underflow limiting features according to the present invention.

The present invention is applicable to various adder circuits of arbitrary size or word length. To illustrate the invention, it is described in detail in a sixteen-bit embodiment, as follows. FIG. 1 is a partial block, partial schematic diagram of an adder circuit 10 that includes output control limiting circuitry. The adder includes a series of 16 adder cells designated ADDER BIT 0-15. Each adder cell receives a respective bit of each operand A[n],B[n] where n is one of the series 0-15, and provides a corresponding inverted sum output signal SUM_OUT[n].

The circuitry within each individual adder cell may be conventional and therefore requires no further discussion. The adder cells each include carry-in and carry-out terminals, not shown except in ADDER BIT 14, which provides both a carry-out signal CARRY and its complement NCARRY.

The SUM_OUT signal from each adder cell is input to a corresponding limiter circuit LIMITER[n]. Each limiter circuit includes a logic OR-AND-INVERT circuit. For example, a limiter circuit 15 in bit position 15 (i.e. LIMITER[15]) includes an OR gate 24 having one input terminal coupled to receive the inverted sum output signal SUM_OUT[15] from the corresponding adder cell ADDER BIT15. The OR gate 24 output terminal is coupled to one of the inputs to a NAND gate 26. The output of NAND gate 26 provides the corresponding result bit Y[15]. Identical limiter circuitry is provided in each bit position (LIMITER[0]-LIMITER[15]).

Adder circuit 10 also includes limiter control circuitry 12. Limiter control circuitry 12 includes overflow and underflow circuits. The underflow circuit comprises a three-input NAND gate 22 and an inverter 30. NAND gate 22 is coupled to receive summand sign bits A[15], B[15] and the NCARRY signal from adder bit 14. The output of NAND gate 22, node 40, is coupled to NAND gate 26 in bit position 15, the result sign bit. The complement of the signal at node 40 appears at node 32. Node 32 is coupled to the first input terminals to the OR gates in each limiter circuit except in bit position 15, the sign bit.

The overflow circuit comprises a three-input NAND gate 50 and an inverter 60. NAND gate 50 is coupled to receive a complement of the summand sign bits, i.e. bits NOT_A[15] and NOT B[15], and the CARRY signal from adder cell 14. The output of NAND gate 50, at node 70, is coupled to the NAND gates in each limiter circuit except in bit position 15. The complement of the signal at node 70 appears at node 62. Node 62 is coupled to OR gate 24 in bit position 15.

Operation in Overflow Condition

Node 70 goes LOW only when both summands are positive (i.e. NOT_A and NOT_B are HIGH) and there is a carry out of bit 14 (CARRY is HIGH). This is an overflow condition because the carry out of bit 14 results in a logic 1 at the result sign bit Y[15], which would erroneously indicate a negative result. Node 70 LOW, however, essentially disables the limiter circuit NAND gates (except the sign bit) and drives the result magnitude bits Y[0]-Y[14] HIGH.

Node 62 is the complement of node 70, so node 62 goes HIGH in response to an overflow condition. Node 62 thus provides a logic 1 to OR gate 24 in the result sign bit limiter circuit. OR gate 24 provides a logic 1 input to NAND gate 26. The other input to NAND gate 26 is coupled to node 40. Node 40 is HIGH except in an underflow condition (described below), so result bit Y[15] goes LOW. The result Y therefore is 0111 . . . 1 the maximum number representable.

Operation in Underflow Condition

The output of NAND gate 22, at node 40, goes LOW only when all three of its input signals are HIGH, i.e. when both summands are negative (A[15] and B[15] are HIGH) and there is no carry out of bit 14 (NCARRY is HIGH). (A carry out of bit 14 would drive result bit 15 HIGH, correctly indicating a negative result.) Node 40 LOW provides a logic 0 to NAND gate 26, forcing the result sign bit Y[15] HIGH, thereby indicating a negative result.

Node 32 is the complement of node 40 and therefore is HIGH during underflow. Node 32 HIGH provides a logic 1 to the OR gates in all limiter circuits except the sign bit, thereby providing a logic 1 input to the NAND gates in those limiter circuits. Since node 70 is normally HIGH, the limiter circuit NAND gate outputs go LOW, thereby forcing the result magnitude bits Y[0]-Y[14] LOW. The result Y in underflow condition, therefore, is zero.

Normal Operation

In the absence of overflow or underflow conditions, i.e. during normal operation, node 70 is HIGH and node 32 is LOW. Each magnitude bit limiter circuit thus inverts the corresponding inverted sum bit (SUM_OUT[n]) to provide the true sum bit. Also, node 40 is HIGH and node 62 is LOW, so the result sign bit limiter circuit 16 similarly inverts SUM_OUT[15] to provide the true result sign bit.

To summarize, each result magnitude bit limiter circuit provides one of a logic LOW, a logic HIGH or the corresponding sum bit, depending on the states of the control signals at nodes 70, 32. The result sign bit limiter circuit provides one of a logic LOW, a logic HIGH or the true result sign bit, depending on the states of the control signals at nodes 40, 62. The control signals operate as illustrated in Table 1, below:

TABLE 1

| Limiter circuit control signals. | | | |
|---|---|---|---|
| NODE 70 | NODE 32 | CONDITION | RESULT MAGNITUDE BITS |
| 0 | X | overflow | HIGH |
| 1 | 0 | normal | SUM[n] |
| 1 | 1 | underflow | LOW |
| NODE 40 | NODE 62 | CONDITION | RESULT SIGN BIT |
| 1 | 1 | overflow | LOW |
| 1 | 0 | normal | SUM |
| 0 | X | underflow | HIGH | where X=don't care

The circuit described is asynchronous, so it provides corrected results without waiting for a clock signal. It also is very fast, as the limiter control logic shown imposes no more delay than the adder cells themselves, so the speed penalty for detecting and correcting overflow and underflow conditions is minimized. The necessary circuitry is small, and the delay is only about 2 nsec for limiting.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A result limiting circuit for use in an n-bit signed binary adder circuit having a sign bit position and at least one magnitude bit position, comprising:
   a sign bit limiter circuit coupled to receive a corresponding inverted sum bit (SUM_OUT[n−1]) for providing a result sign bit (Y[n−1]);
   in each magnitude bit position, a magnitude bit limiter circuit (LIMITER[0-(n−1)]) coupled to receive a respective inverted sum bit (SUM_OUT[0-(n−2)]) for providing a corresponding result bit (Y[0-(n−2)]); and
   a limiter control circuit coupled to receive the operand sign bits (A[n−1], B[n−1]) and carry signals into the sign bit position in the adder (CARRY, NCARRY) for controlling the limiter circuits;
   each of the sign bit limiter circuit and the magnitude bit limiter circuits comprising a logic OR-AND-INVERT circuit for selectively setting the corresponding result bit to one of HIGH, LOW and a complement of the corresponding inverted sum bit.

2. Apparatus according to claim 1 wherein:
   the limiter control circuit includes a first NAND gate having first and second input terminals coupled to receive the operand sign bits (A[n−1], B[n−1]) and having a third input terminal coupled to receive a complement of a carry signal into the sign bit adder cell (NCARRY), for providing an underflow logic signal that goes LOW responsive to an underflow condition; and
   the underflow logic signal is coupled to the sign bit limiter circuit so as to set the result sign bit HIGH responsive to the underflow condition.

3. Apparatus according to claim 2 wherein:
   the limiter control circuit further comprises a second NAND gate having first and second input terminals coupled to receive complement operand sign bits (NOT_A[n−1], NOT_B[n−1]) and having a third input terminal coupled to receive a carry signal (CARRY) into the sign bit, for providing an overflow logic signal that goes LOW responsive to an overflow condition; and
   the overflow logic signal is coupled to all the magnitude result bit limiter circuits so as to set all the result magnitude bits HIGH responsive to the overflow condition.

4. Apparatus according to claim 1 wherein the limiter control circuit includes:
   a first NAND gate having first and second input terminals coupled to receive the operand sign bits (A[n−1], B[n−1]) and having a third input terminal coupled to receive a complement of a carry signal (NCARRY) into the sign bit adder cell, for providing an underflow logic signal that goes LOW responsive to an underflow condition;
   a first inverter coupled to receive the underflow logic signal for providing a complement underflow logic signal;
   a second NAND gate having first and second input terminals coupled to receive complement operand sign bits (NOT_A[n−1], NOT_B[n−1]) and having a third input terminal coupled to receive a carry signal (CARRY) into the sign bit adder cell, for providing an overflow logic signal that goes LOW responsive to an overflow condition; and
   a second inverter coupled to receive the overflow logic signal for providing a complement overflow logic signal; and wherein
   the overflow logic signal and the complement underflow logic signal are coupled to all of the result magnitude bit limiter circuits (LIMITER[0-(n−2)]) for controlling said limiter circuits to set the magnitude result bits HIGH responsive to an overflow condition, LOW responsive to an underflow condition and equal to a complement of the corresponding sum bit (SUM_OUT[n]) under a normal condition.

5. Apparatus according to claim 4 wherein:
   each of the magnitude bit limiter circuits includes a two-input OR gate and a two-input NAND gate, the OR gate output terminal being coupled to one input to the NAND gate;
   the complement underflow logic signal is coupled to one input to the OR gate in each of the magnitude bit limiter circuits;
   the overflow logic signal is coupled to the other input to the NAND gate in each of the magnitude bit limiter circuits; and
   the corresponding sum bit is coupled to the other input to the OR gate in the respective magnitude bit limiter circuit.

6. Apparatus according to claim 4 wherein:
   the sign bit limiter circuit includes a two-input OR gate and a two-input NAND gate, the OR gate output terminal being coupled to one input to the NAND gate;
   the complement overflow logic signal is coupled to one input to the OR gate in the sign bit limiter circuit;
   the underflow logic signal is coupled to the other input to the NAND gate in the sign bit limiter circuit; and
   the inverted sign sum bit (SUM_OUT[n−1]) is coupled to the other input to the OR gate in the sign bit limiter circuit;
   whereby the result sign bit (Y[n−1]) is set HIGH responsive to an underflow condition, LOW responsive to an overflow condition and equal to the true sign sum bit under a normal condition.

7. A signed binary adder circuit for summing a pair of two's complement operands (A,B) comprising:
   a sign bit circuit and a plurality of magnitude bit circuits;
   each of the magnitude bit circuits comprising an adder cell coupled to receive a respective bit of both operands to provide a corresponding inverted sum bit and a limiter circuit; and
   limiter control logic means coupled to receive the operands for providing a first control logic signal that is HIGH only responsive to an underflow condition and a second control logic signal that is LOW only responsive to an overflow condition;
   each magnitude bit limiter circuit including:

an OR gate having two input terminals and an output terminal; and a NAND gate having two input terminals and an output terminal for providing a respective result magnitude bit;

a first one of the OR gate input terminals being coupled to receive the corresponding inverted sum bit;

the other one of the OR gate input terminals being coupled to receive the first limiter control logic signal;

the OR gate output terminal coupled to a first one of the NAND gate input terminals; and the other one of the NAND gate input terminals coupled to receive the second limiter control logic signal;

whereby each result magnitude bit is set HIGH responsive to an overflow condition, set LOW responsive to an underflow condition and set equal to the complement of the corresponding inverted sum bit otherwise.

8. A signed binary adder circuit according to claim 7 wherein:

the sign bit circuit comprises a sing bit adder cell coupled to receive the sign bits of the operands and a sign bit limiter circuit for providing a result sign bit; the sign bit limiter circuit including an OR gate having two input terminals and an output terminal and a NAND gate having two input terminals and an output terminal for providing the result sign bit;

a first one of the OR gate input terminals being coupled to receive a complement of the sum of the operand sign bits;

the other one of the OR gate input terminals being coupled to receive a complement of the second limiter control logic signal;

the OR gate output terminal coupled to a first one of the NAND gate input terminals; and the other one of the NAND gate input terminals coupled to receive a complement of the first limiter control logic signal;

whereby the result sign bit is set LOW responsive to an overflow condition, set HIGH responsive to an underflow condition and set to the sum of the operand sign bits otherwise.

* * * * *